United States Patent [19]

Cryer

[11] 4,204,099
[45] May 20, 1980

[54] ELECTRICAL SWITCH

[75] Inventor: Edward Cryer, Higham, Nr. Burnley, England

[73] Assignee: Lucas Industries Limited, Birmingham, England

[21] Appl. No.: 910,336

[22] Filed: May 30, 1978

[30] Foreign Application Priority Data

Sep. 13, 1977 [GB] United Kingdom ............... 38046/77

[51] Int. Cl.² ............................................. H01H 25/06
[52] U.S. Cl. .......................................... 200/4; 200/18; 200/153 P
[58] Field of Search ................. 200/4, 17 R, 18, 61.27, 200/61.3, 61.31, 61.34, 61.35, 61.54, 153 P

[56] References Cited

U.S. PATENT DOCUMENTS

3,511,943  5/1970  Kibler ............................ 200/61.27 X

Primary Examiner—Gene Z. Rubinson
Assistant Examiner—Morris Ginsburg
Attorney, Agent, or Firm—Holman & Stern

[57] ABSTRACT

An electrical switch of the kind wherein an operating lever is movable relative to the fixed body of the switch in whole or in part in different modes to operate contacts of the switch. The switch includes a contact carrier which is supported on the fixed body for movement relative thereto in a first plane between first and second positions. A movable contact member is supported by the carrier, but is movable relative to the carrier between first and second positions. First and second fixed electrical contacts are engageable by the contact member in the first position of the contact member while the contact carrier occupies its first position, and third and fourth fixed electrical contacts are spaced from the first and second fixed electrical contacts in the direction of movement of the contact carrier. The third and fourth fixed contacts are engageable by the movable contact member while the contact member is in its first position but with the carrier in its second position. Movement of the lever or part of the lever in one of its modes causes movement of the movable contact member relative to the contact carrier while movement of the lever in the other of its modes causes movement of the carrier relative to the body.

20 Claims, 7 Drawing Figures

ELECTRICAL SWITCH

BACKGROUND OF THE INVENTION

This invention relates to an electrical switch of the kind wherein an operating lever of the switch is movable relative to the fixed body of the switch, in whole or in part, in different modes to operate contacts of the switch.

There are many known forms of electrical switch of the kind specified above, for example, there are those shown in British Pat. Nos. 1318882 and 1411784. In the arrangement shown in British Pat. No. 1318882 the operating lever is movable bodily in two different modes, namely two mutually perpendicular planes, and in addition part of the operating lever is movable in a third mode, namely in the direction of the length of the operating lever. However, each of the three modes of movement of the operating lever or part thereof controls a separate set of electrical contacts and thus in effect three separate electrical switches are combined by having a common body and common operating member. Such an arrangement is costly in terms of numbers of components and manufacturing steps, and furthermore is restrictive in the degree of complexity of functions which can be achieved within a given spatial envelope.

In British Pat. No. 1411784 the component utilisation has been minimised since both modes of movement of the operating lever operate exactly the same electrical contacts. Clearly however the complexity of function is reduced to a minimum also since the operating lever controls exactly the same electrical circuits irrespective of its mode of movement.

SUMMARY OF THE INVENTION

It is an object of the present invention to provide an electrical switch of the kind specified in a simple and convenient form providing economy of components and flexibility in choice of function.

An electrical switch according to the invention includes a body, an operating lever extending from the body and movable relative thereto at least in part, in two different directional modes, a contact carrier supported on the body for movement relative thereto in a first plane between first and second positions, a movable contact member supported by said carrier for movement relative to the carrier between first and second positions, first and second fixed electrical contacts engageable by said movable contact member in the first position of the movable contact member while the contact carrier is in its first position, and third and fourth fixed electrical contacts spaced from said first and second fixed electrical contacts in the direction of movement of the contact carrier and engageable by said movable contact member in the first position of the movable contact member relative to the carrier, while the carrier is in its second position, movement of the lever or said part thereof in one of said modes causing movement of the movable contact member relative to the contact carrier and movement of the lever in the other of said two modes causing movement of the carrier relative to the body.

Conveniently, the switch includes fifth and sixth fixed electrical contacts spaced from the first and second fixed contacts in the direction of movement of the movable contact member relative to the carrier and engageable by said member in its second position while the carrier is in its first position.

Preferably, there are further provided seventh and eighth fixed electrical contacts spaced from said third and fourth contacts in the direction of movement of the contact member relative to the carrier and spaced from said fifth and sixth contacts in the direction of movement of the carrier relative to the body, said seventh and eighth contacts being engageable by said movable contact member in the second position of the member while the carrier is in its second position.

Conveniently, means is provided for holding said member in its first and second positions relative to the carrier.

Desirably said means includes a spring loaded overcentre mechanism associated with the movable contact member which serves to hold the member in either of said first and second positions until displaced sufficiently far towards the other position to move said mechanism overcentre.

Preferably, the second position of the carrier relative to the body is an unstable position from which the carrier is resiliently urged to its first, rest position.

Desirably, movement of said member relative to the carrier is effected by movement of at least part of the operating lever relative to the body in the direction of the length of the lever, while movement of the carrier relative to the body is effected by angular movement of the lever relative to the body about a first axis transverse to the length of the lever.

Conveniently, said lengthwise movement of the lever operates said movable contact member by way of a bistable mechanism, said lengthwise movement being opposed by resilient means and the arrangement being such that a first movement of the lever or part thereof from a rest position against the action of said resilient means moves the contact member from its first position to its second position and a second subsequent movement of the lever or part thereof from its rest position returns the contact member from said second to said first position.

Preferably, the first, second and third and fourth contacts lie in a first plane parallel to the direction of movement of the carrier relative to the body, the fifth, sixth, seventh and eighth contacts lie in a second plane parallel to the first plane and the contact member is disposed between said first and second plane.

It is an object of a further embodiment of the present invention to provide a switch as defined in the preceding paragraph wherein the same electrical circuit is completed in the second position of the carrier irrespective of the position of the movable contact relative to the carrier. In a switch in accordance with said further embodiment of the invention, the first, second and fifth contacts are defined by individual first, second and fifth contact elements of the switch, the third and seventh contacts are defined by regions of a third contact element of the switch and the fourth, seventh and eighth contacts are defined by regions of a fourth contact element of the switch, whereby in the second position of the carrier the movable contact member in its first position bridges the third and fourth contacts thus interconnecting the third and fourth contact elements and in its second position bridges the seventh and eighth contact elements again interconnecting the third and fourth elements.

Preferably, the operating lever is movable angularly relative to the body about a second axis transverse to the length of the lever, said second axis also being transverse to said first axis and the switch including further electrical contacts operable by movement of the lever about said second axis.

Desirably the carrier is movable relative to the body beyond it second position to operate still further contacts of the switch.

Conveniently resistance means is incorporated in the switch so that the operator must overcome an increased resistance to movement in moving the carrier beyond its second position.

Preferably, the switch includes a rotor movable relative to the body by rotation of the lever or part thereof about an axis parallel to the length of the lever and a bridging contact piece carried by the rotor and movable therewith relative to further fixed contacts.

Desirably throughout its range of movement said bridging contact piece remains in engagement with an extension of said fifth contact element and is selectively engageable with either of ninth and tenth fixed contacts so as to bridge either said extension and said ninth contact or said extension and said tenth contact.

Conveniently the switch incorporates detent means defining stable positions of the rotor relative to the body.

Preferably the rotor and a rotatable part of the lever include meshing gear teeth whereby rotation of said part of the lever is transmitted to said rotor.

Conveniently, the switch incorporates an inhibitor means whereby rotation of the lever or said part thereof is prevented when the lever is moved about said first axis from a rest position.

BRIEF DESCRIPTION OF THE DRAWINGS

One example of the invention is illustrated in the accompanying drawings, wherein.

DETAILED DESCRIPTION OF A PREFERRED EMBODIMENT

Referring to the drawings, the switch includes a moulded synthetic resin body 11 from which extends an operating stalk 12. Housed within the body 11 is a moulded synthetic resin rotor 13 having an integral boss 14 received in a corresponding recess in the base 11a of the body 11. The boss 14 mounts the rotor for rotational movement within the body about an axis at right angles to the base 11a. The boss 14 is hollow, and extending into the boss is an integral lug 16 of a moulded synthetic resin support member 15. The support member 15 is pivotable relative to the rotor 13 about the axis of pivotal movement of the rotor 13 relative to the base 11a. Upstanding from the member 15 are a pair of parallel walls 17 and engaged between the walls 17 is a pivot piece 18. The pivot piece 18 is moulded in synthetic resin material and is pivotally mounted between the walls 17 for movement about an axis 19 (FIG. 1), the axis 19 extending at right angles to the axes of movement of the rotor and the member 15. The pivot piece 18 is formed with an upstanding lug 21 which extends into an elongate aperture 22 in the wall of the body remote from the base 11a. In a rest position of the pivot piece 18 about the axis 19 the lug 21 engages one end of the elongate aperture 22 and its axis is co-extensive with the axis of the lug 16. The aperture 22 is elongate so as to permit movement of the lug 21 relative to the body 11 during pivotal movement of the pivot piece 18 about the axis 19.

The pivot piece 18 is formed with a through bore extending at right angles to the axis 19. Received in the bore is one end of a metal tube 23 defining the basis of the operating stalk 12. The tube 23 is rotatable within the bore of the pivot piece 18 but is held against axial movement in one direction relative thereto by a circlip which abuts the pivot piece and is held against axial movement in other direction by a moulded synthetic gear element 24 which is secured to the tube and which abuts the face of the pivot piece 18 remote from the circlip. At its end remote from the pivot piece 18 the tube 23 carries a moulded synthetic resin knob assembly 25. The knob assembly 25 includes an anchor member 26 secured to the tube 23 and a two-part uter cover 27, 28. The cover part 27 is keyed to the member 26 so as to be capable of movement relative thereto in the direction of length of the tube 23, while at the same time being non-rotatable relative thereto. The second cover part 28 closes an open of the first cover part 27 and a spring 29 acts betweeen the cover part 28 and the member 26 to urge the cover 27 longitudinally of the tube 23. A flexible brass wire 31 is anchored at one end to the cover part 28 and extends through the tube 23 to protrude at its other end within the body 11. Movement of the knob assembly 25 relative to the tube 23 against the action of the spring 29 increases the extent by which the rod 31 protrudes from the inner end of the tube 23. Rotation of the knob 25 is transmitted to the tube 23 and thus rotates the gear element 24 relative to the body 11. An aesthetically pleasing sleeve encases the tube 23 between the gear element 24 and the knob 25.

The rotor 13 of the switch includes an upstanding wall 32 at the end of the body 11 through which the stalk 12 extends. The upper free edge of the wall 32 defines a linear rack, having gear teeth 33. The gear teeth 33 mesh with equivalent gear teeth on the outer periphery of the gear element 24 whereby rotation of the stalk 12 causes rotational movement of the rotor 13 about the boss 14 relative to the body 11. Such movement of the rotor 13 takes place relative to the member 15, but rotational movement of the member 13 through a small angular extent, (to be described in more detail later, can be achieved with an equal movement of the member 15 by moving the stalk 12 laterally in a first plane relative to the body 11 thus pivoting the rotor 13, the member 15 and the pivot piece 18 relative to the body about the axis of the lugs 16, 21. The movement of the pivot piece 18 about the axis 19 is effected by movement of the stalk 12 in a plane at right angles to the plane of movement of the stalk 12 necessary to pivot the rotor and member 15.

Figure 4:
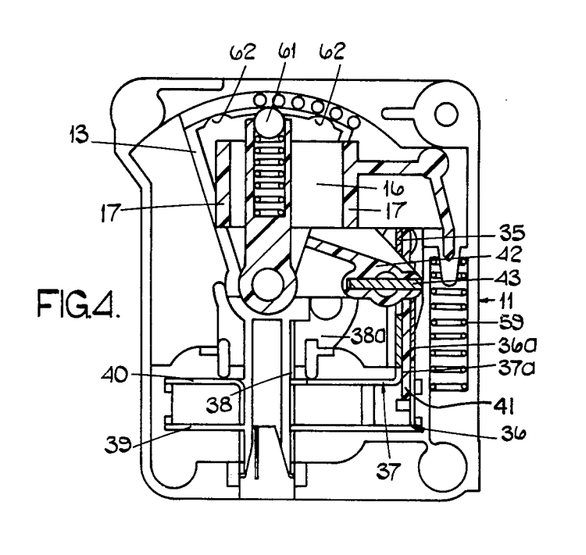
FIG. 4 is a composite sectional view generally in a plane at right angles to the plane of the section of FIG. 1.

Adjacent the opposite end of the body 11 from the stalk 12 is a contact assembly. The contact assembly comprises six contact upstanding from the base 11a, the six contact plates including integral extensions which extend through the base 11a and define blade terminals or the exterior of the base 11a. The six contact plates 35, 36, 37, 38, 39 and 40 are best seen in FIGS. 4 and 5, and with the exception of contact plate 35 they are complex shapes.

The contact plate 35 is in the form of a flat plate upstanding on edge from the base 11a and having its plane generally parallel with the plane containing the stalk 12. Aligned with the contact plate 35 is a plane area 37a of the contact 37 the area 37a and contact 35 being spaced apart. Parallel to and spaced laterally from the contact area 37a and the contact 35 is a contact area 36a of the contact 36. The uppermost edges of the areas 36a, 37a and the contact 35 are co-planar and the contact area 36a is spaced from the area 37a and the contact 35 by an insulating plate 41.

Co-planar with the upper edge surfaces of the areas 36a, 37a and the contact 35 is an arcuate region 38a, of the contact plate 38. The rotor 13 has an integral arm 42 carrying a conductive bridge piece 43. Throughout the range movement of the rotor relative to the body the bridge piece 43 remains in engagement with the part 38a of the contact 38, and dependent upon the angular position of the rotor relative to the body the bridge piece 43 engages in addition to the part 38a the upper edge of one or other of the contacts 35 and the contact area 36a, 37a. The dependent upon the angular position of the rotor 13 relative to the body 11 the bridging piece 43 completes an electrical circuit between the contact 38 and one of the contacts 35, 36, 37. The contacts 36, 37 include integral extensions 36b, 37b lying at right angles to their regions 36a, 37a. The contact 39 is aligned with and spaced from the region 36b and aligned with and spaced from the region 37b is a region 40b of contact 40. The contact 40 includes a region 40c extending at right angles to the region 40b the contact 39 and the region 40c being cut away respectively as can be seen in FIG. 5 so that an edge of region 40c lies in the plane of contact 39. Similarly contact 37 includes a region 37c extending at right angles to the region 37b, the region 37c and the region 36b being respectively shaped so that an edge of region 37c is co-planar with region 36b. Contact 38 includes a region 38b extending upwardly from the region 38a, region 38b and region 37b of the contact 37 being cut away so that an edge of region 38b is co-planar with region 37b.

Figures 5, 6:
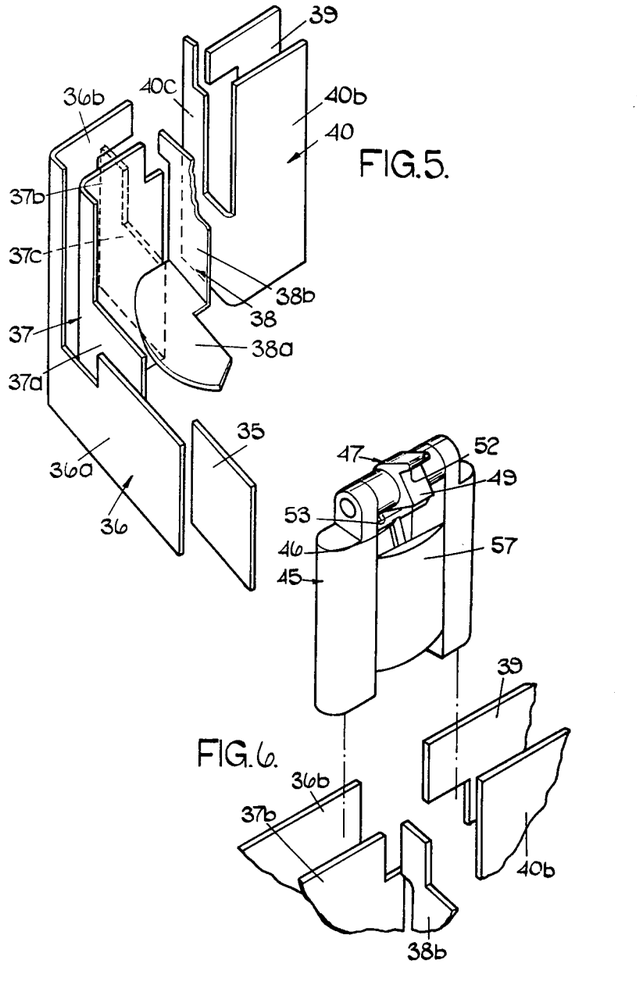
FIG. 5 is a diagrammatic perspective representation of part of the contact arrangement of the switch shown in FIG. 1.
FIG. 6 is a diagrammatic perspective representation similar to FIG. 5 but showing the moving contact and its movable carrier in relation to the fixed contacts.
Figure 7:
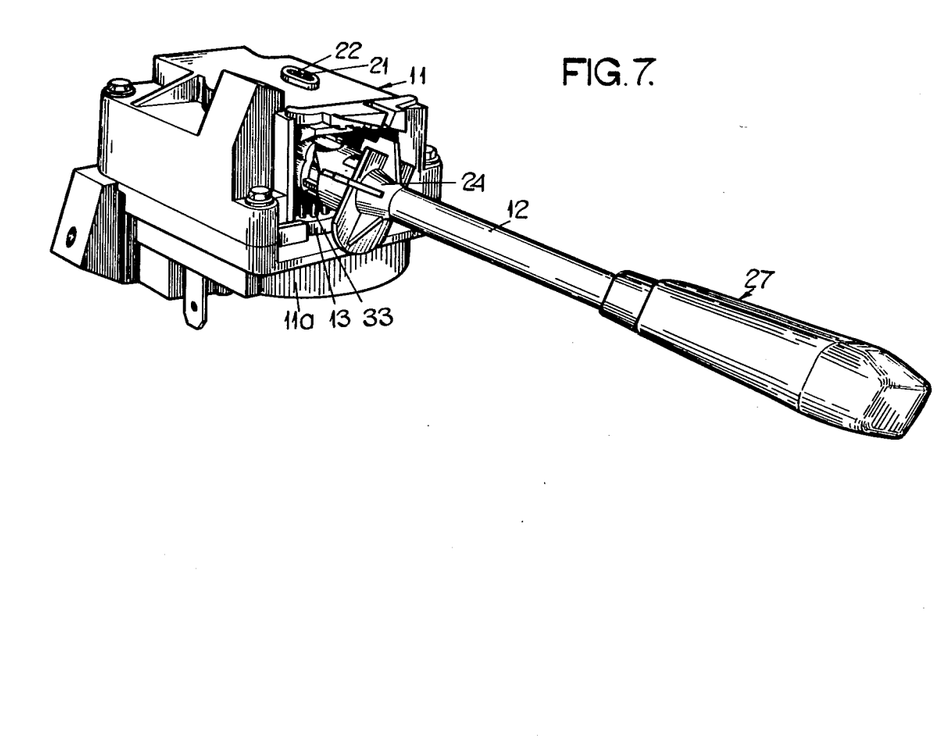
FIG. 7 is a perspective view of the switch.

As is best seen in FIGS. 5 and 6 a channel is defined within the contact assembly with the contact 39, the forward edge region of 40c, the forward edge region of 37c, and the region 36b defining the rear wall of the channel and region 40b and the rear edge of region 38b and region 37b defining the front side of the channel. Although not shown in FIG. 5 the upstanding regions of the contacts 36–40 are supported by parts of the body moulding. Disposed within the channel defined within the contacts is a moving contact carrier 45 movable towards and away from the base 11a. The contact carrier 45 is spring urged in a direction away from the base 11a by springs (not shown) and supported between a pair of opposed fulcrums for rocking movement on the carrier 45 is a bridging strip 46. A spring 46a acts between the carrier 45 and the strip 46 and urges the strip 46 so that its uppermost end which is T-shaped engages a toggle member 47 which is pivotally mounted on the carrier 45 for movement about an axis 48 parallel to the axis of rocking movement of the strip 46 relative to the carrier 45. The toggle member 47, strip 46 and spring 46a act in relation to the carrier 45 as an over-centre toggle mechanism having first and second stable positions.

Figure 1:
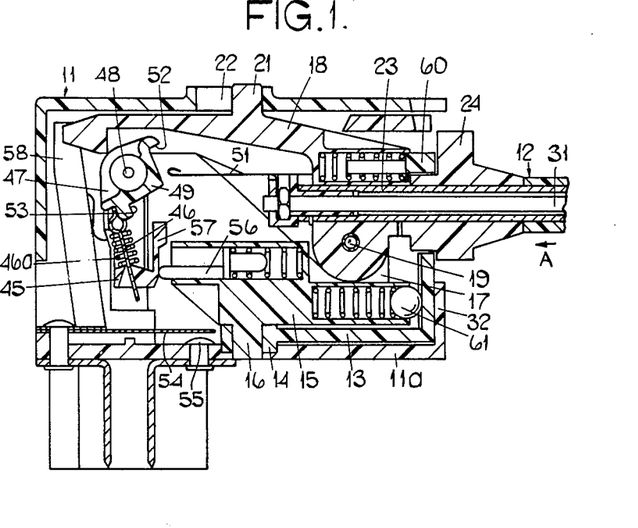
FIG. 1 is a composite sectional view of an electrical switch.
Figure 2:
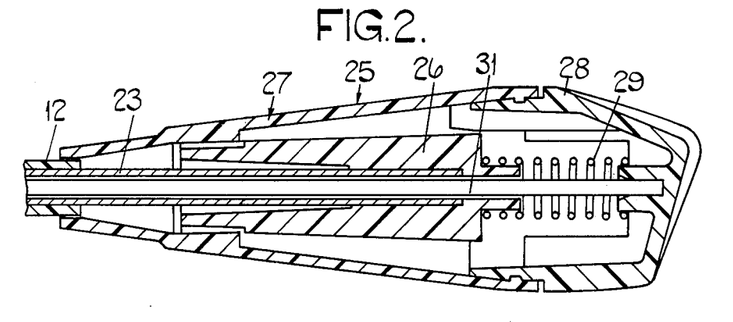
FIG. 2 is a sectional view of the operating lever omitted from FIG. 1.
Figure 3:
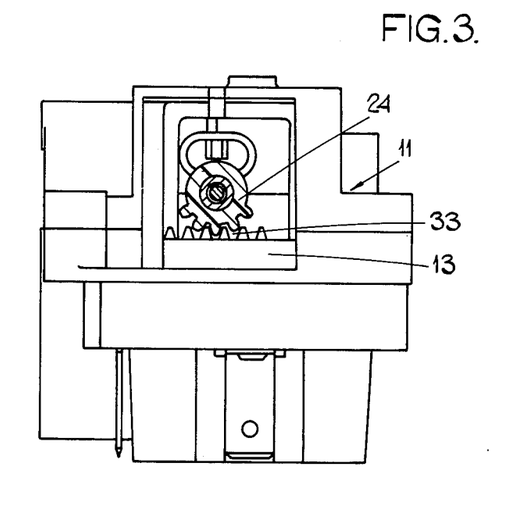
FIG. 3 is a view, partly in section, in the direction of Arrow A in FIG. 1.

The first stable position is as shown in FIG. 1, and in the second stable position the toggle member 47 is rotated in a counter-clockwise direction and the strip 46 is pivoted in a clockwise direction. It will be seen that the toggle member 47 presents an apical edge 49 to the innermost end of the rod 31. The rod 31 carries a spring blade 51 which extends towards the apical edge 49 of the toggle member 47. The arrangement is such that in the axial rest position of the knob assembly 25 the free end of the spring blade 51 lies clear of the apical edge 49, and that in the first stable position of the toggle member 47 the apical edge 49 lies below the plane of the spring blade 51 whereas in the second stable position of the toggle member 47 the apical edge 49 lies above the plane of the blade 51. Movement of the knob assembly 25 against the action of the spring 29 causes the free end of the blade 51 to abut the toggle member 47 to slide along the surface thereof until reaching the abutment 52, 53. In the first stable position of the toggle 47 the blade 51 will engage abutment 52 and thereafter will cause counter-clockwise rotation of the toggle member 47 to switch the toggle assembly to its second stable position. Movement of the knob assembly 25 in the second stable position of the toggle mechanism causes abutment of the blade 51 with the abutment 53 thus rotating the toggle member 47 in a clockwise direction to move the toggle mechanism to its first stable position. Thus irrespective of the position of the toggle mechanism the movement of the knob assembly 25 against the action of the spring 29 moves the toggle mechanism from one stable position of the other.

As mentioned above the carrier 45 is spring urged in a direction away from the base 11a. The pivot piece 18 abuts the carrier 45, and thus pivotal movement of the pivot piece 18 about the axis 19 in a counter clockwise-direction depresses the carrier 45 against the action of the springs. In the rest position of the carrier 45 the bridging strip 46 in the first position engages the contact 39 and the region 36b of the contact 36 and thus bridges the contacts 39, 36. In the second stable position of the strip 46, the strip engages the region 40b of the contact 40 and the region 38b of the contact 38 thus bridging the contacts 38, 40. In the depressed position of the carrier 45 the strip 46 bridges the contact 40 and the contact 37 irrespective of whether it is in its first or its second stable position. In the first stable position the strip engages the region 40c of the contact 40 and the region 37c of the contact 37 while in the second stable position the strip 46 engages an area of the region 40b below that area engaged in the rest position of the carrier and the region 37b of the contact 37. It will be appreciated from the foregoing description that the movable contact strip 46 is a common bridging contact for all of combinations of the fixed contact regions and areas 36b, 39; 38b, 40b; 37b, 40b; 37c, 40c.

A portion of the strip 46 projects from the lower surface of the carrier 45 and in a fully depressed position the projecting portion of the strip 46 engages a leaf spring contact 54 supported on the base 11a, and flexes the contact 54 into engagement with a fixed contact piece 55. A spring loaded plunger 56 carried by the member 15 rides on a cam surface 57 of the carrier 45 the cam surface 57 being shaped to co-operate with the plunger 56 to provide a resistance to movement at a predetermined point in the movement of the carrier 45 against the action of its springs. Thus when operating the switch by moving the stalk 12 to pivot piece 18 about the axis 19 the operator feels an increase in resistance to movement which must be overcome before the strip 46 engages and deflects the leaf spring 54.

A second leaf spring contact 58 is electrically connected to the leaf spring contact 54 and is flexed by the pivot piece 18 to engage contact region 40c by movement of the pivot piece about the axis of the lugs 21, 16. Abutment between the pivot piece 18 and the body define a rest position of the pivot piece 18 and member 15 about the axis of the lugs 16, 21 and a spring 59 carried by the body and acting against an extension of the member 15 urges the member 15 and the pivot piece 18 to the rest position.

As mentioned above the contact 43 has three stable positions in relation to the contacts 35, 36, 37 and the three corresponding stable positions of the rotor 32 are defined relative to the member 15 by means of a spring pressed ball 61 carried by the member 15 and engaging in an appropriate one of three angularly spaced grooves 62 in the inner surface of the wall 32 of the rotor 13. A further detent mechanism 60 acts between the pivot piece 18 and the element 24 also to define the three stable positions. The mechanism 60 is the primary detent mechanism, the ball 61 being provided to ensure that the rotor is retained in the chosen position when the lever 12 is moved to pivot piece 18 so disengaging the element 24 from the teeth 33.

In one practical embodiment of the switch described above the switch is intended to control operation of the windscreen wipers and windscreen washers of a road vehicle. Contact 35 is electrically connected in use through the intermittent wipe circuit of the wiper motor to earth, contact 36 is connected through the slow run circuit of the wiper motor to earth, contact 37 is connected through the fast run circuit of the wiper motor to earth, contact 38 does not have an external electrical connection, contact 39 is electrically connected through the limit switch of the wiper motor to earth, and contact 40 is electrically connected to the positive terminal of the vehicle battery, the negative terminal of the vehicle battery being earthed. The spring blades 54, 58 are both electrically connected through the windscreen washer motor to earth, and the contact 55 is electrically connected through a delayed wipe circuit of the motor to earth. In operation let us assume that pivot piece 18 is in its rest position in both of its directions of angular movement, and that the strip 46 is in its first position. Lastly let as assume that the rotor 13 is in its first stable position, that is to say with the contact piece 43 bridging the contacts 38 and 35. With the parts of the switch in these conditions the windscreen wiper motor is not operative since the strip 46 is bridging the slow run contact 36 and the limit switch contact 39 thus short circuit the armature of the motor in a parked position of the motor. There is no electrical feed to the contact 38. Depression of the knob assembly 25 against its spring causes the strip 46 to be toggled from its first position to its second position. In the second position the strip 46 bridges the contact 40 and the contact 38 and thus completes an electrical feed to the intermittent wipe circuit of the wiper motor by way of the contact 38, the bridging strip 43 and the contact 35. Thus the wiper motor is operated in a predetermined intermittent mode. The frequency of operation may be a single predetermined frequency or may be adjustable at the will of the driver. With the strip 46 remaining in its second position, rotation of the knob assembly 25 causes movement of the rotor 13 of the switch from is first position to its second position thus causing the strip 43 to bridge the contacts 36 and 38. Thus the wiper motor is now operated in its slow run condition and similarly the further rotation of the knob assembly in the same direction causes the bridging piece 43 to move to bridge the contacts 38, 37 thus energising the wiper motor in its fast run condition. Reverse rotation of the knob assembly 25 moves the rotor 13 relative to the body and the member 15 in the opposite direction, and it will be understood that in any of the three positions a further depression of the knob assembly 25 against its spring 29 will move the strip 47 back to its first position deenergising the contact 38 and making the parking circuit of the wiper motor by bridging the slow run and limit switch contacts 36, 39.

Movement of the stalk 12 in a direction to move the pivot piece 18 and member 15 together with the rotor 13 about the axes of the lugs 16, 21 causes the end region of the pivot piece 18 to deflect the leaf spring 58 into engagement with a fixed contact region 40c. The fixed contact region 40c engaged by the leaf spring 58 is an electrical feed contact, and thus the screen washer motor circuit is energised by way of the fixed contact and the leaf spring 58. The degree of movement necessary to move the leaf spring 58 into engagement with its fixed contact is relatively small, and is insufficient to disturb the electrical circuit made by way of the bridging piece 43. Thus although the bridging piece 43 moves, because the rotor moves then nevertheless it does not move sufficiently far from any one of its stable positions to disrupt the circuit made in that stable position. Upon release of the stalk 12 the spring 59 returns the member 15, and therefore the pivot piece 18, the stalk 12 and the rotor 13 to their original position relative to the body 11.

Movement of the stalk 12 in a direction to move the pivot piece 18 about the pivot axis 19 causes the strip 46 to bridge the contacts 37, and 40 irrespective of whether the strip 46 is in its first or its second position. With the strip in its first position the strip would have been engaging contact 39 and contact area 36b and upon depression of the carrier 57 the strip is caused to move into engagement with the region 40c and the region 37c. In the event that upon depression of the carrier 57 the strip 46 is in its second position then it will have been engaged with the region 40b and the region 38b and will remain in engagement with region 40b but will move downwardly into engagement with the regions 37b. Thus irrespective of the position of the strip 47 the pivotting movement of the pivot piece 18 about the pivot axis 19 causes the fast run circuit of the wiper motor to be energised. Immediately upon release of the stalk 12 spring means returns the pivot piece 18 to its rest position and the spring acting on the carrier 45 raises the carrier 45 and thus the strip 46 to its rest position. Thus a brief movement of the stalk 12 to pivot the pivot piece 18 will cause energisation of the wiper motor in its fast run condition and assuming that the strip 46 is in its first position then although the stalk 12 may immediately be released the motor will continue to operate for the wipers to perform one complete wiping stroke before the limit switch of the motor is operated to park the wipers. In the event that the strip 46 is in its second position then irrespective of the operative position of the rotor and contact piece 43 the wipers will be operated in their fast run condition while the pivot piece 18 is held in its pivotted position. Upon release of the stalk the wiper motor will revert to its operation previous to the movement of the pivot piece 18.

It will be recognised from the foregoing description that the movement of the pivot piece 18 about the axis 19 provides what is generally known as a "flick-wipe" facility. However the carrier 45 together with the strip 46 and the member 47 can be depressed by the pivot piece 18 beyond the position necessary to achieve the "flick-wipe" function. Movement beyond this position, as described above, engages the cam surface of the cam form 57 with the spring loaded plunger 56 so that the operator of the switch feels increased resistance to movement of the stalk. If the operator overcomes the increased resistance to movement then the projecting region of the strip 46 engages the leaf spring 54. It will be recalled that in the depressed condition irrespective of the operative position of the strip 46, the strip 46 will be engaged with the feed contact 40. Thus immediately the end region of the strip 46 engages the leaf spring 54 an electrical circuit is completed to the windscreen washer motor from the feed contact 40 through the strip 46 and the leaf spring 54. Thus the windscreen washers can be operated in conjunction with the "flick-wipe" function. Lastly, further depression of the carrier 45 under the action of the pivot piece 18 causes the leaf sping 54 to be deflected into engagement with the contact 55. The contact 55 is connected in a delayed wipe circuit of the wiper motor, the delayed wipe circuit causing a further single wiping cycle to be performed after a predetermined delay from the point in time at which the circuit at the contact 55 is broken. Thus engagement of the leaf spring contact 54 with the fixed contact 55 energises the delay circuit so that upon subsequent return of the carrier 45 to its rest position the engagement of the leaf spring 54 with the contact 55 is broken and the engagement of the strip 45 with the spring 54 is broken. Thus the "flick-wipe" function has ceased and the windscreen washer motor has ceased to operate. However, there may still be residual washing liquid on the windscreen of the vehicle and thus the delayed wiping cycle initiated at a predetermined delay after the disengagement of the leaf spring 54 from the fixed contact 55 clears any residual washing liquid from the windscreen.

The gear element 24 is provided with three projections each of which can engage in a slot in the cover of the body 11 during movement of the stalk 12 to pivot the pivot piece 18 about the axis 19. The three projections are associated with the three rotational positions of the element 24 respectively and the engagement of a projection in the slot in the cover prevents rotation of the stalk about its longitudinal axis and further prevents movement of the stalk to pivot the rotor 13, carrier 15 and pivot piece 18 about the axes of the lugs 16, 21 during the time that the stalk 12 is held in a position wherein the pivot piece 18 is pivoted from its rests position about the axis 19. Thus with the exception of the on-off facility afforded by the knob assembly 25 which of course has no effect during the "flick-wipe" function, no other operative function of the stalk 23 can be performed during "flick-wipe" operation. It will be understood that movement of the pivot piece 18 about the axis 19 reduces the depth of meshing of the teeth of the element 24 with the teeth 33 and so an effect of preventing rotation of the gear element 24 in this position is to reduce the possibility of the teeth of element 24 "jumping over" the teeth 33 and so altering the relationship of the element 24 and the rotor 13.

While the various functions of the switching mechanism have been described, for the purposes of clear understanding in relation to a windscreen washer and wiper control switch is is to be understood that the switching mechanism described above can be utilized if necessary with modifications to the contact arrangements, to control other functions, not necessarily restricted to automobile applications.

I claim:

1. An electrical switch including a body, an operating lever extending from the body and movable relative thereto at least in part, in two different directional modes, a contact carrier supported on the body for movement relative thereto in a first plane between first and second positions, a movable contact member supported by said carrier for movement relative to the carrier between first and second positions, first and second fixed electrical contacts engageable by said movable contact member in the first position of the movable contact member while the contact carrier is in its first position, and third and fourth fixed electrical contacts spaced from said first and second fixed electrical contacts in the direction of movement of the contact carrier and engageable by said movable contact member in the first position of the movable contact member relative to the carrier while the carrier is in its second position, movement of the lever or said part thereof in one of said modes causing movement of the movable contact member relative to the contact carrier and movement of the lever in the other of said two modes causing movement of the carrier relative to the body.

2. A switch as claimed in claim 1 further including fifth and sixth fixed electrical contacts spaced from the first and second fixed contacts in the direction of movement of the movable contact member relative to the carrier and engageable by said member in its second position while the carrier is in its first position.

3. A switch according to claim 2 further including seventh and eighth fixed electrical contacts spaced from said third and fourth contacts in the direction of movement of the contact member relative to the carrier and spaced from said fifth and sixth contacts in the direction of movement of the carrier relative to the body, said seventh and eighth contacts being engageable by said movable contact member in the second position of the member while the carrier is in its second position.

4. A switch as claimed in any one of claims 1 to 3 further including means for holding said member in its first and second positions relative to the carrier.

5. A switch as claimed in claim 4 wherein said means includes a spring loaded over-centre mechanism associated with the movable contact member, which serves to hold the member in either of said first and second positions until displaced sufficiently far towards the other position to move said mechanism over-centre.

6. A switch as claimed in claim 1 wherein the second position of the carrier relative to the body is an unstable position from which the carrier is resiliently urged to its first, rest position.

7. A switch as claimed in claim 5 wherein the second position of said carrier relative to the body is an unstable position from which the carrier is resiliently urged to its first, rest position.

8. A switch as claimed in claim 1 wherein movement of said member relative to the carrier is effected by movement of at least part of the operating lever relative to the body in the direction of the length of the lever, while movement of the carrier relative to the body is effected by angular movement of the lever relative to the body about a first axis transverse to the length of the lever.

9. A switch as claimed in claim 8 wherein said lengthwise movement of the lever operates said movable contact member by way of a bistable mechanism, said lengthwise movement being opposed by resilient means and the arrangement being such that a first movement of the lever or part thereof from a rest position against the action of said resilient means moves the contact member from its first position to its second position and a second subsequent movement of the lever or part thereof from its rest position, returns the contact member from said second to said first position.

10. A switch as claimed in claim 3 wherein the first, second and third and fourth contacts lie in a first parallel plane to the direction of movement of the carrier relative to the body, the fifth, sicth, seventh and eighth contacts lie in a second plane parallel to the first plane and the contact member is disposed between said first and second planes.

11. A switch as claimed in claim 10 wherein the first and second and fifth contacts are defined by individual first, second and fifth contact elements of the switch, the third and seventh contacts are defined by regions of a third contact element of the switch and the fourth, seventh and eighth contacts are defined by regions of a fourth contact element of the switch, whereby in the second position of the carrier the movable contact member in its first position bridges the third and fourth contacts thus interconnecting the third and fourth contact elements and in its second position bridges the seventh and eighth contacts again interconnecting the third and fourth elements.

12. A switch as claimed in claim 8 or claim 9 wherein the operating lever is movable angularly relative to the body about a second axis transverse to the length of the lever, said second axis also being transverse to said first axis and the switch including further electrical contacts operable by movement of the lever about said second axis.

13. A switch as claimed in claim 8 wherein the operating lever is movable angularly relative to the body about a second axis transverse to the length of the lever, said second axis also being transverse to said first axis and the switch including further electrical contacts operable by movement of the lever about said second axis.

14. A switch as claimed in claim 1 wherein the carrier is movable relative to the body beyond its second position to operate still further contacts of the switch.

15. A switch as claimed in claim 14 wherin resistance means is incorporated in the switch so the operator must overcome an increased resistance to movement in moving the carrier beyond its second position.

16. A switch as claimed in claim 1 wherein there is provided a rotor movable relative to the body by rotation of the lever or part thereof about an axis parallel to the length of the lever and there is a bridging contact piece carried by the rotor and movable therewith relative to further fixed contacts.

17. A switch as claimed in claim 11 wherein there is provided a rotor movable relative to the body by rotation of the lever or part thereof about an axis parallel to the length of the lever and there is a bridging contact piece carried by the rotor and movable therewith relative to further fixed contacts, said bridging contact piece throughout its range of movement remaining in engagement with an extension of said fifth contact element and being selectively engageable with either of ninth and tenth fixed contacts so as to bridge either said extension and said ninth contact or said extension and said tenth contact.

18. A switch as claimed in claim 16 or claim 17 incorporating detent means defining stable positions of the rotor relative to the body.

19. A switch as claimed in claim 16 wherein the rotor and rotatable part of the lever include meshing gear teeth whereby rotation of said part of the lever is transmitted to said rotor.

20. A switch as claimed in claim 8 incorporating inhibitor means whereby rotation of the lever or said part thereof is prevented when the lever is moved about said first axis from a rest position.

* * * * *